(12) United States Patent
Kaji et al.

(10) Patent No.: US 8,096,167 B2
(45) Date of Patent: Jan. 17, 2012

(54) ACOUSTIC LEAK DETECTOR WITH NOISE CANCELLATION

(75) Inventors: Katsuhiro Kaji, Fujimi (JP); Kazuhiro Saijo, Asaka (JP)

(73) Assignee: Fuji Tecom Inc., Tokyo (JP)

( * ) Notice: Subject to any disclaimer, the term of this patent is extended or adjusted under 35 U.S.C. 154(b) by 179 days.

(21) Appl. No.: 12/144,083

(22) Filed: Jun. 23, 2008

(65) Prior Publication Data

US 2008/0314123 A1     Dec. 25, 2008

(30) Foreign Application Priority Data

Jun. 23, 2007   (JP) ................................. 2007-165714

(51) Int. Cl.
*H04B 15/00* (2006.01)
*G01M 3/18* (2006.01)

(52) U.S. Cl. ...... 73/40.5 R; 73/49.1; 73/49.5; 381/94.1; 381/94.3; 381/94.7

(58) Field of Classification Search ................ 73/40–52; 381/94.1, 94.3, 94.7; 24/115 R, 129 R, 130, 24/131 R, 129 D
See application file for complete search history.

(56) References Cited

U.S. PATENT DOCUMENTS

| 2,015,403 | A | * | 9/1935 | Kiddle et al. | 24/135 R |
| 4,309,576 | A | * | 1/1982 | Corrigan | 381/161 |
| 4,455,863 | A | * | 6/1984 | Huebler et al. | 73/40.5 A |
| 4,648,159 | A | * | 3/1987 | Dougherty | 24/712.7 |
| 4,953,144 | A | * | 8/1990 | Chin et al. | 367/135 |
| 5,744,700 | A | * | 4/1998 | Carme et al. | 73/40.5 A |
| 6,163,504 | A | * | 12/2000 | Komninos et al. | 367/135 |
| 6,227,036 | B1 | * | 5/2001 | Yonak et al. | 73/40.5 A |
| 6,725,705 | B1 | * | 4/2004 | Huebler et al. | 73/40.5 A |
| 6,785,618 | B2 | * | 8/2004 | Kechter et al. | 702/39 |
| 7,107,839 | B1 | * | 9/2006 | Berman et al. | 73/489 |
| 7,203,322 | B1 | * | 4/2007 | Bostock | 381/67 |
| 2005/0177322 | A1 | * | 8/2005 | Cosentino et al. | 702/41 |

* cited by examiner

*Primary Examiner* — David A. Rogers
(74) *Attorney, Agent, or Firm* — Sughrue Mion, PLLC (57) ABSTRACT

The present invention provides a leakage detector enabling accurate and stable detection for occurrence and a position of leakage in a buried fluid pipe line and also making it possible for even those not so skilled in the leakage detection work to use the detector. The leakage detector 1 according to the present invention comprises a vibration detector 2 having a pickup 6 incorporating a piezoelectric element; a main body 4 of the detector incorporating voltage amplifiers 31, 37 for voltage-amplifying an output signal and a plurality types of noise removing units 33, 34, 35 for removing noises from the output signal, and a headphone 5. The main body 4 of the detector has a display unit 15 for displaying data for detected vibration sounds on a predefined screen.

7 Claims, 9 Drawing Sheets

ACOUSTIC LEAK DETECTOR WITH NOISE CANCELLATION

BACKGROUND OF THE INVENTION

1. Field of the Invention

The present invention relates to a leakage detector for detecting occurrence and positions of leakage of a fluid such as water or gas flowing a fluid conduit such as a water pipe or a gas pipe buried under the ground.

2. Description of Related Art

Figure 8:
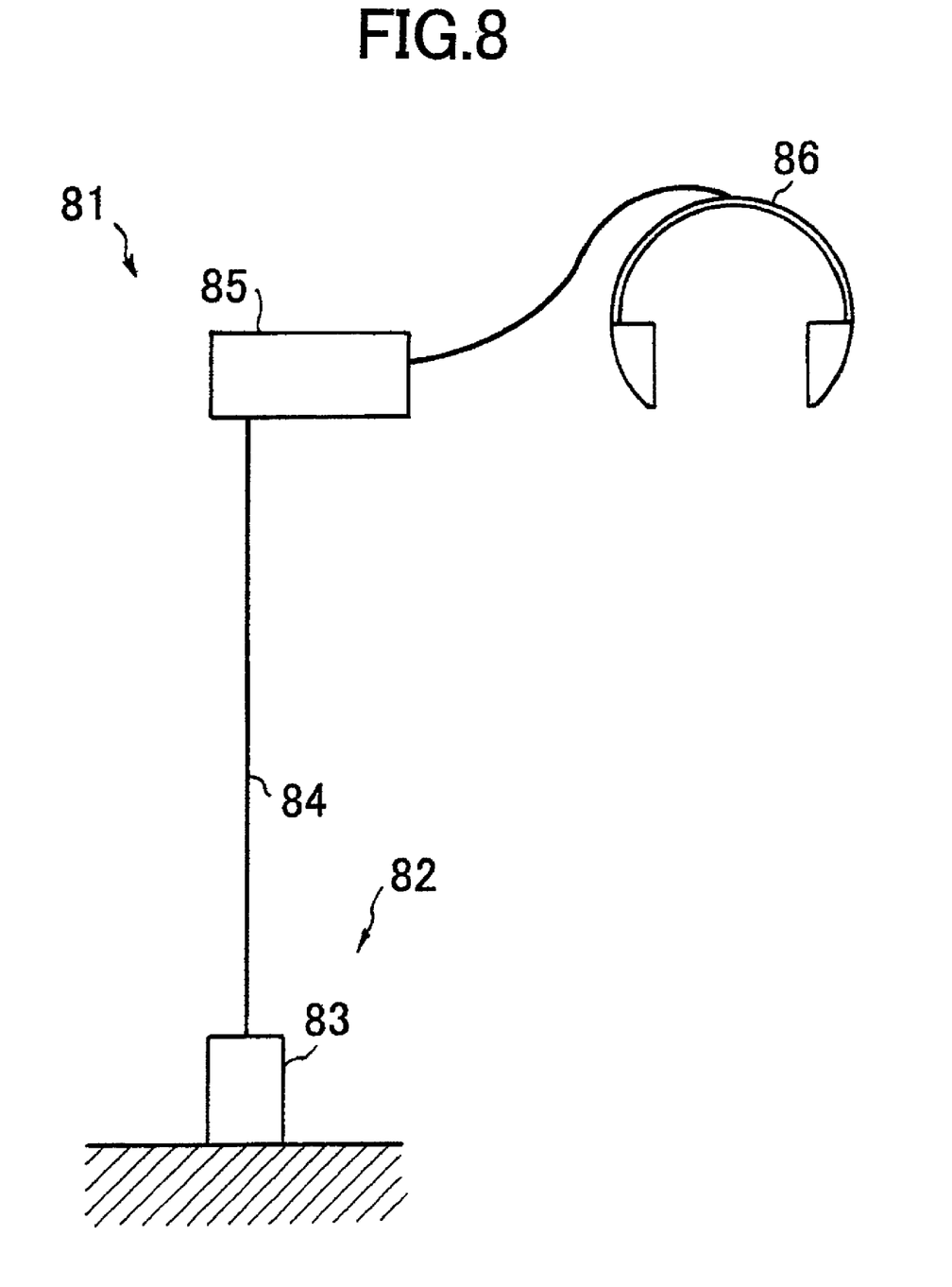
FIG. 8 is a general block diagram illustrating a leakage detector based on the conventional technology.

As a detector for detecting occurrence and positions of leakage of a fluid such as water or gas flowing a fluid conduit such as a water pipe line or a gas pipe line buried under the ground, there has been known an audible leakage detector 81 comprising a vibration detector 82 having a pickup 83 and a cord 84, a voltage amplifier 85, and a headphone 86 as shown in FIG. 8 (Refer to, for instance, Japanese Patent Laid-Open Publication No. HEI 10-325778).

Figure 9:
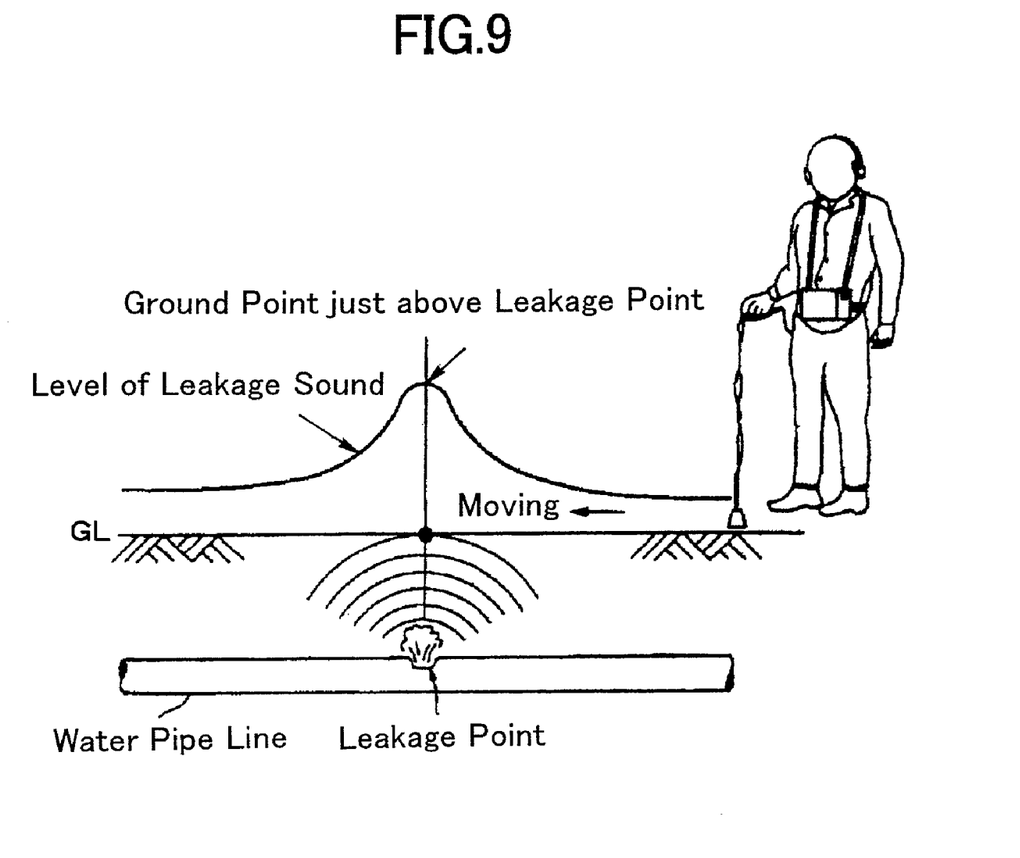
FIG. 9 is an explanatory view illustrating a case where leakage detection is performed with an audible leakage detector.

When occurrence and a position of leakage of water in a water pipe line is detected with the leakage detector 81, an operator holds the voltage amplifier 85 hung down from the operator's neck portion with a belt on the operator's wrist with the belt, and also mounts the headphone 86 on the operator's head as shown in FIG. 9. In this state, the operator places the pickup 83 on the ground surface holding the cord 84 with one hand at an appropriate position.

When power for the voltage amplifier 85 is turned ON, water leakage sounds caused by minute vibrations generated at a water leakage point in a water pipe line and propagated through the earth are caught with the pickup 83 placed on the ground surface, and are converted to electric signals. Then the electric signals are voltage-amplified by the voltage amplifier 85 to an audible level, and the sounds are output from the headphone 86 in the audible state.

The operator places the pickup 83 on the ground surface along the water pipe line with a space of 0.5 to 1.0 m and listens to the output sounds from the headphone 86. Then the operator determined according to amplitude or tone of the output sounds whether water leakage has occurred or not, and determined, when a level of the output sound is maximized, that the water leakage point is present in the water pipe line just below.

The vibrations (sounds) generated at the water leakage point in the water pipe line are substantially attenuated while propagating through the ground before reaching the ground surface, and change to minute vibrations. Therefore, the works for detecting water leakage are generally performed at night when traffic noises generated by cars, pedestrians, and the like, industrial noises from factories and construction sites, and dairy life noises generated by in-store equipment, automatic vending machines, and the like become extremely small.

Even at night, however, actually the traffic noises by cars, pedestrians, and the like are temporally generated, and also dairy life noises by in-store equipment installed in store staying open until late at night and automatic vending machines are constantly generated, although the nose level is low. In the situation as described above, when noise detection is performed with the leakage detector 81 based on the conventional technology, the noises are captured by the pickup 83 and mixed in output sounds from the headphone 86, and therefore it has been difficult to accurately detect occurrence and positions of leakages without fail.

Furthermore, in the leakage detection work with the leakage detector 81 based on the conventional technology, an operator listens to output sounds from the headphone 86, determines occurrence of leakage according to amplitude and tone of the output sounds, and detects a leakage point when a level of the output sounds is maximized, and therefore the work can be performed only by those substantially experienced and skilled in the leakage detection work.

SUMMARY OF THE INVENTION

The present invention was made in the light of the circumstances as described above, and an object of the present invention is to provide a leakage detector capable of accurately detecting occurrence and a position of leakage in a buried fluid pipe line without fail even at night when the traffic noises by cars, pedestrians, and the like are temporally generated and also dairy life noises by in-store equipment installed in store staying open until late at night and automatic vending machines are constantly generated.

Another object of the present invention is to provide a leakage detector enabling even those not so skilled in the leakage detection work to accurately detect occurrence and a position of leakage in a buried fluid pipe line without fail.

For achieving the objects described above, the leakage detector according to the present invention comprises a vibration detector having a pickup incorporating a piezoelectric element, a main body of the detector incorporating a voltage amplifier for voltage-amplifying output signals and several types of noise removers for removing noises from the output signals, and a headphone.

With the configuration as described above, an optimal noise remover can be selected by taking into consideration the noises being generated in an environment where leakage detection is to be performed, and therefore it is possible to accurately detect occurrence and a position of leakage in a buried fluid pipe line without fail.

It is preferable that the plurality types of noise removers can be combined for use according to the necessity, and also that the operating conditions can be changed.

The main body of the detector preferably has a display unit for displaying detected vibration sound data on a predefined screen.

With the configuration as described above, a level of detected vibrations is provided not only as audio data, but also as visual data such as displays of numerical values or a graph, and therefore even those not so much skilled in the leakage detection work can accurately detect occurrence and a position of leakage in a buried fluid pipe line without fail.

BRIEF DESCRIPTION OF THE DRAWINGS

FIG. 4A is a front view, FIG. 4B is a left side view, FIG. 4C is a top view, and FIG. 4D is a right side view each illustrating a main body of the detector.

DETAILED DESCRIPTION OF THE INVENTION

Preferred embodiments of a leakage detector according to the present invention are described in detail below with reference to the related drawings.

Figure 1:
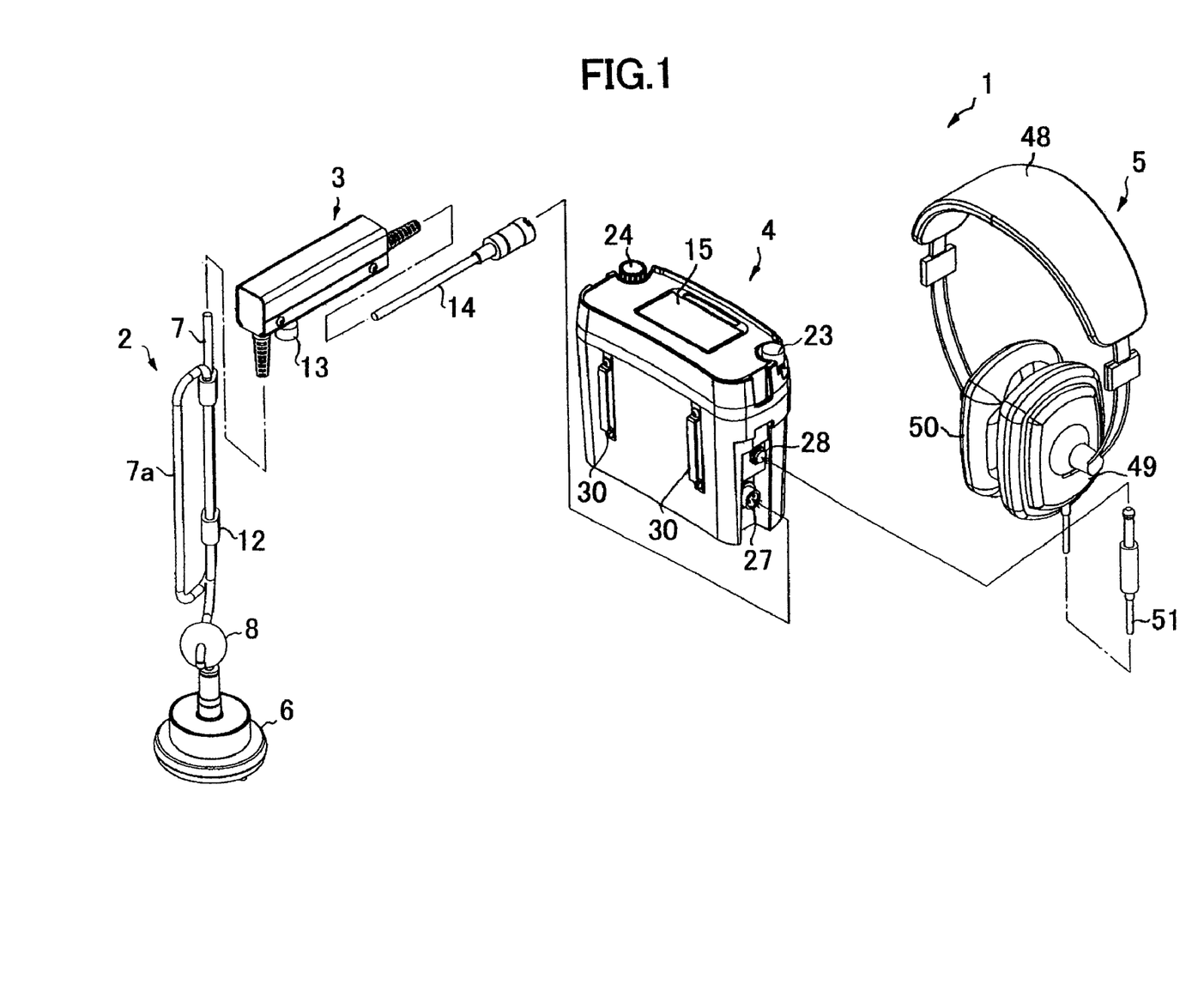
FIG. 1 is a perspective view illustrating a configuration of a leakage detector according to the present invention.
Figure 2:
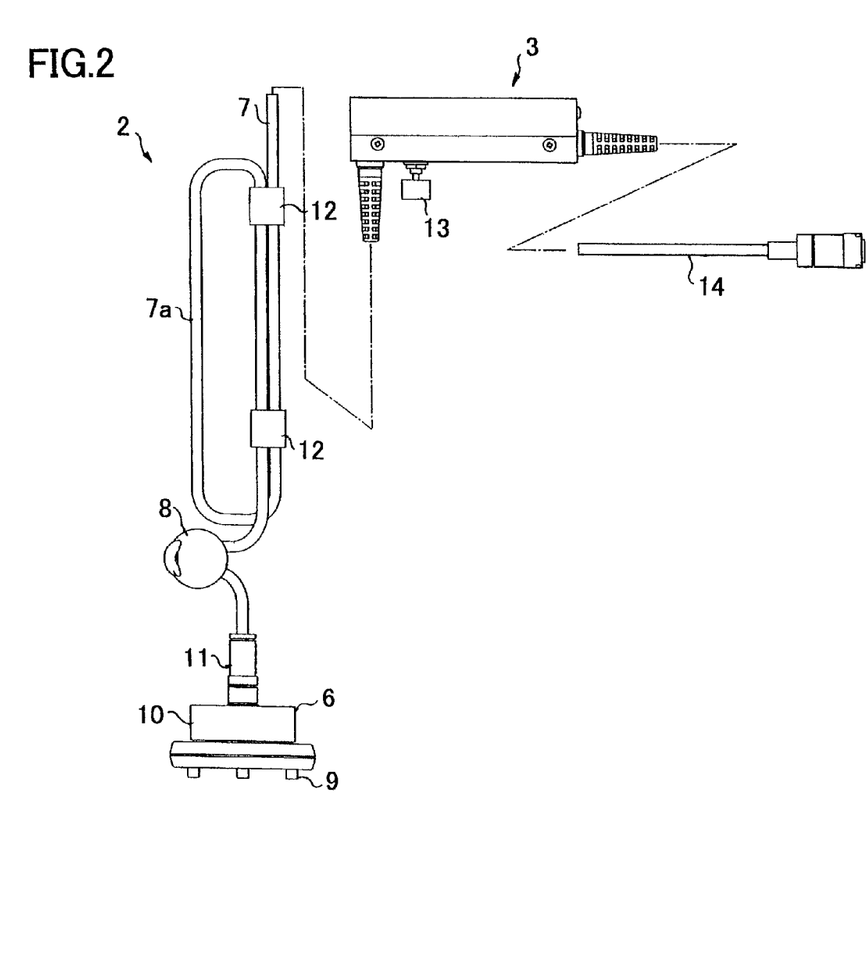
FIG. 2 is a front view illustrating a vibration detector and a handle member.
Figure 3:
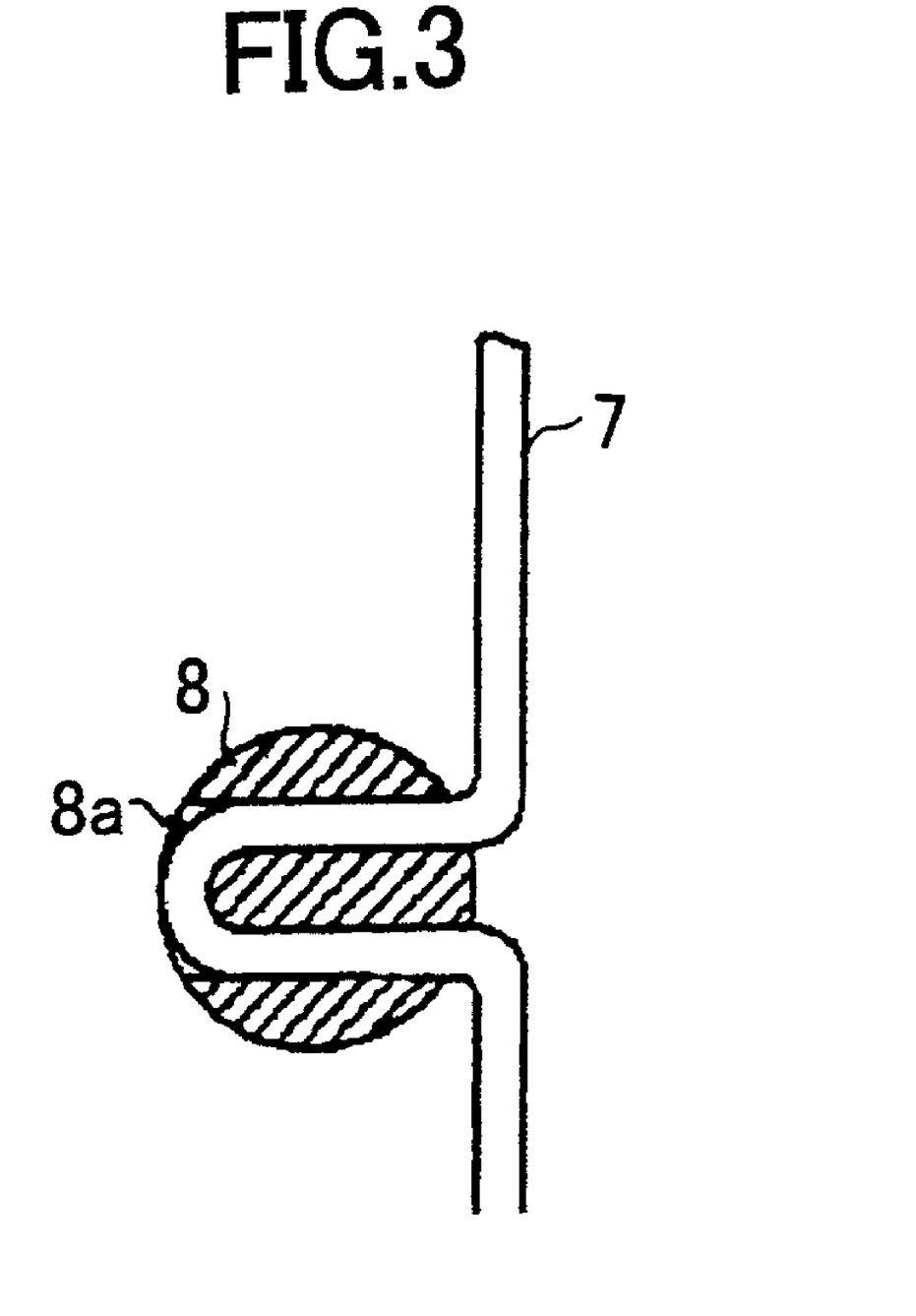
FIG. 3 is a cross-sectional view illustrating a noise absorbing member.
Figure 4:
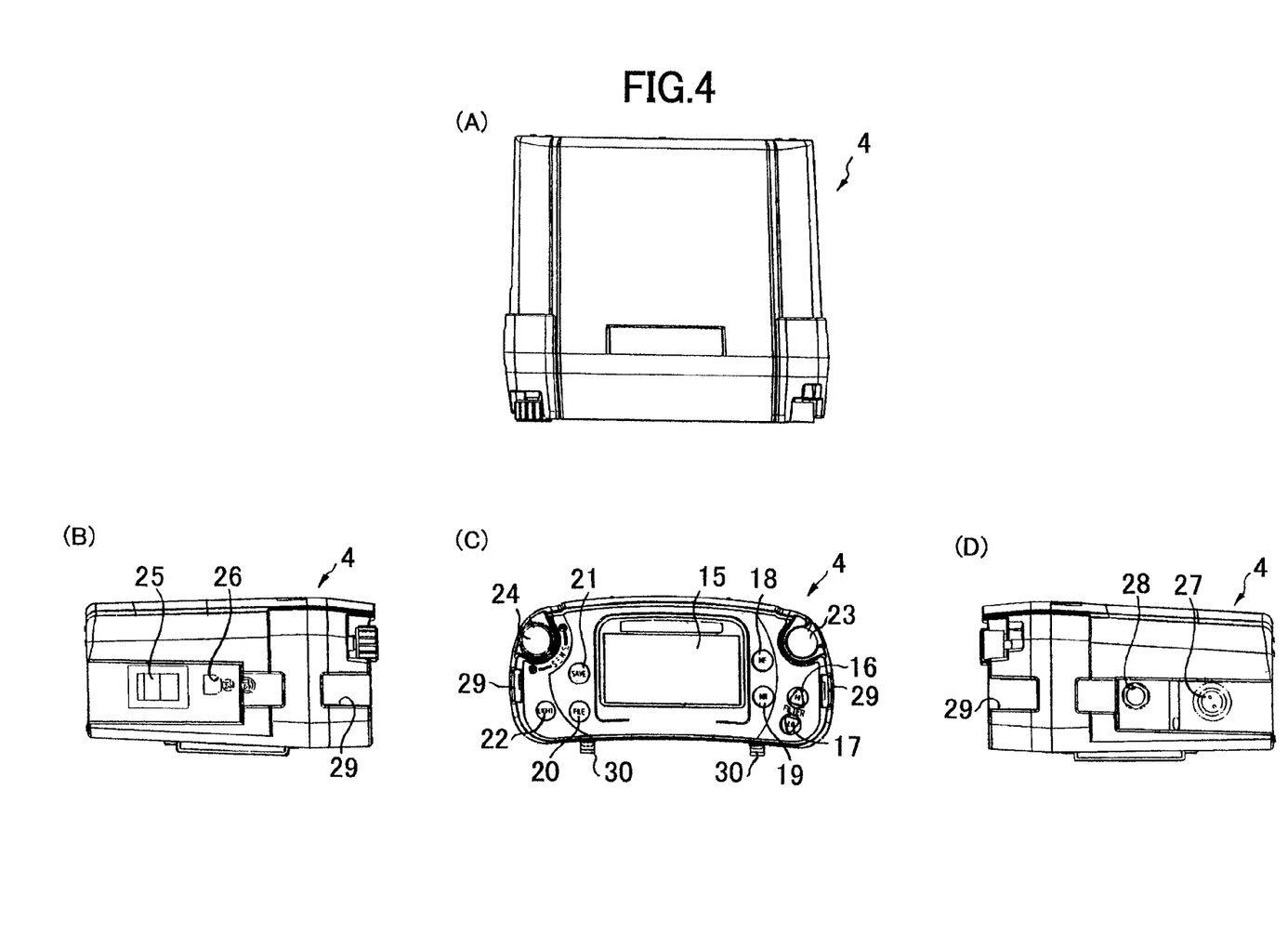

FIG. 1 is a perspective view illustrating a configuration of the leakage detector according to the present invention; FIG. 2 is a front view illustrating a vibration detector and a handle member; FIG. 3 is a cross-sectional view illustrating a noise absorbing member; FIG. 4 is a view illustrating a main body of the leakage detector, and FIG. 4A is a front view, FIG. 4B is a left side view, FIG. 4C is a top view, and FIG. 4D is a right side view each illustrating the main body of the leakage detector.

A leakage detector 1 according to the present invention comprises a vibration detector 2, a handle member 3, a main body of the detector 4, and a headphone 5, as shown in FIG. 1.

The vibration detector 2 comprises a pickup 6, a cord 7, and a noise absorbing member 8, as shown in FIG. 1 and FIG. 2.

The pickup 6, as shown in FIG. 2, comprises a mounting section 9, a main body 10, and a connecting section 11. In the mounting section 9, a plurality of stems are formed by folding a metal plate. The main body 10 incorporates a vibrator made of metal and a piezo-electric element fixed to the vibrator, and is covered with a rubber-made cover. Furthermore, the connecting section 11 incorporates a connector and is covered with a rubber-made cover.

In the pickup cord 7, as shown in FIG. 2, a conductor wire connected to a harness of the piezo-electric element is covered with a protector made of vinyl chloride. The lower portion of the pickup cord 7 is wound up to form a loop section 7a, and the overlapping portion is bundled by bundling members 12, 12 made of rubber.

The noise absorbing member 8 is a rubber-made block as shown in FIG. 2 and FIG. 3, and an insertion path 8a having a substantially horse shoe-shaped form and also having a diameter substantially identical to that of the pickup cord 7 is formed inside the noise absorbing member 8.

A portion lower than the loop section 7a is inserted into the insertion path 8a, and the noise absorbing member 8 is attached at a position adjacent to the pickup 6 of the cord 7.

Although the cord 7 is posited unstably in the air during a leakage detection work, in the vibration detector 2, the loop section 7a is formed at the lower portion of the cord 7, and the overlapping portion of the cord is bundled by the bundling members 12, 12, so that minute vibrations in the horizontal direction caused by winds and movements of the operator's hand is reduced. Thus, the noises caused by the hissing sound of the wind and by abrasion are hardly generated in the cord 7.

Furthermore, because the noise absorbing member 8 which is a rubber-made block is attached at a position adjacent to the pickup 6 of the cord 7, even when noises are generated by winds or abrasion in the cord 7, the minute vibrations caused by the noises are absorbed by the noise absorbing member 8 due to the effects of the material itself and the inertial mass. Therefore the noises caused by the hissing and abrasion can be effectively removed.

The cord 7 is inserted to the inserting path 8a, the cord 7 is extensively bent at at least two portions, and the protector of the cord 7 is hardened to provide higher capability of absorbing vibrations. Thus, the minute vibrations in the horizontal and vertical directions are absorbed in the bent portions, and the noises caused by hissing and abrasion are effectively removed.

The handle member 3 has a form like a rectangular column as shown in FIG. 1 and FIG. 2. An end portion of the cord 7 is connected to the handle member 3 via a rubber-made bush projecting at a lower end of the housing, and a cord 14 is connected to a rear surface of the hand member 3 via a rubber-made bush projecting backward. A switch for hearing sounds 13 is provided at a front lower surface of the housing, and the operator can press the switch 13 with an index finger and the like while gripping the handle member 3.

As described above, the switch 13 for hearing sounds is provided at a front lower surface of the member 3, so that the operator can operate the switch 13 while gripping the member 3. Thus, the operator is not required to move one hand to the main body 4 severally and check a switch for hearing sound 23 provided on the body 4 to press, and high operability is provided.

In the main body 4 of the detector, as shown in FIG. 1 and FIG. 4, a display unit 15 comprising an LCD is provided at a central portion of the top face thereof, and a high-pass filter setting key 16, a low-pass filter setting key 17, a comb filter setting key 18, a delayed noise removal mode setting key 19, a screen display switching key 20, a data storage key 21, and a back light key 22 are arranged around the display unit 15.

The switch for hearing sound 23 is provided at a right-upper portion of the top surface, while a detection range setting dial 24 is provided at a left-upper portion of the top surface.

A power switch 25 and a communication port 26 are provided on a left side surface of the main body 4 of the detector, and a vibration detector connector 27 and a head phone jack 28 are provided at a right side surface thereof.

Locking groove sections 29, 29 for locking a lower end of a band for hanging down the main body 4 are formed at central upper end portions of the left and right side surfaces, and retaining members 30, 30 for inserting the band for retaining the main body 4 are fixed to both side portions of the rear surface.

Figure 5:
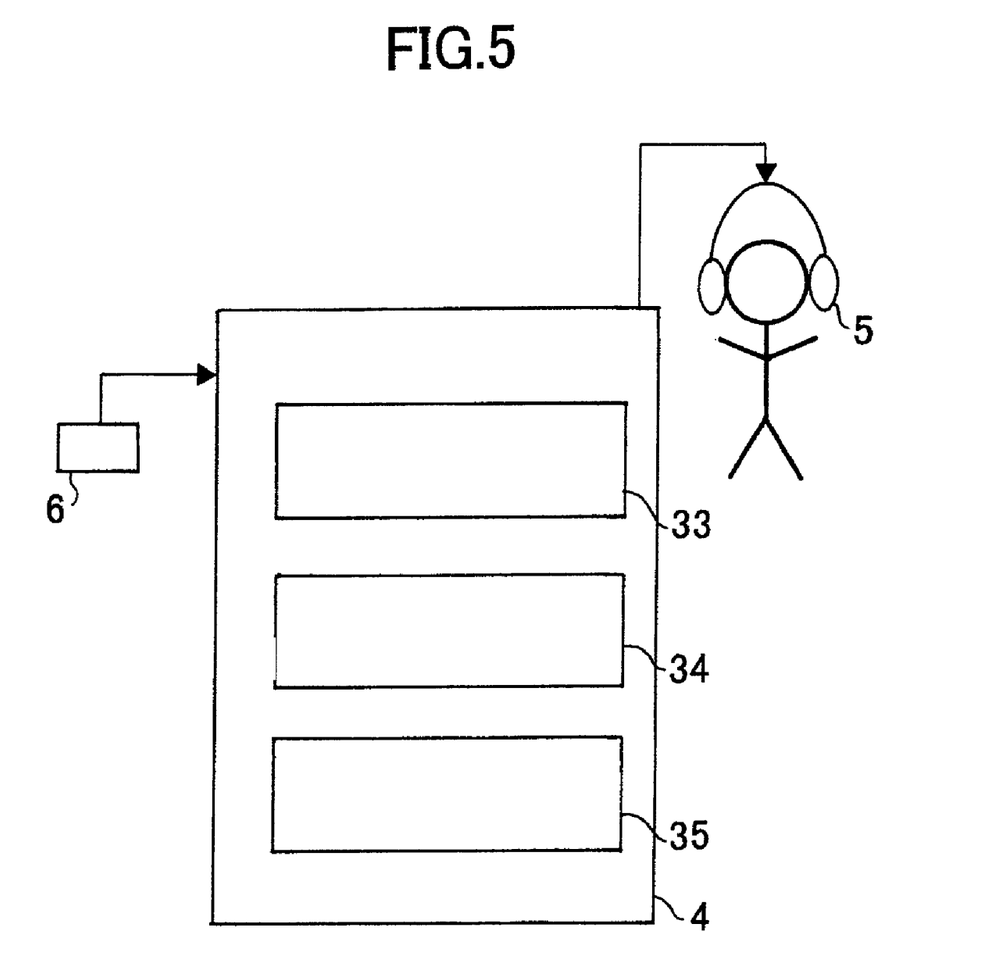
FIG. 5 is a general block diagram illustrating inside of the main body of the detector.
Figure 6:
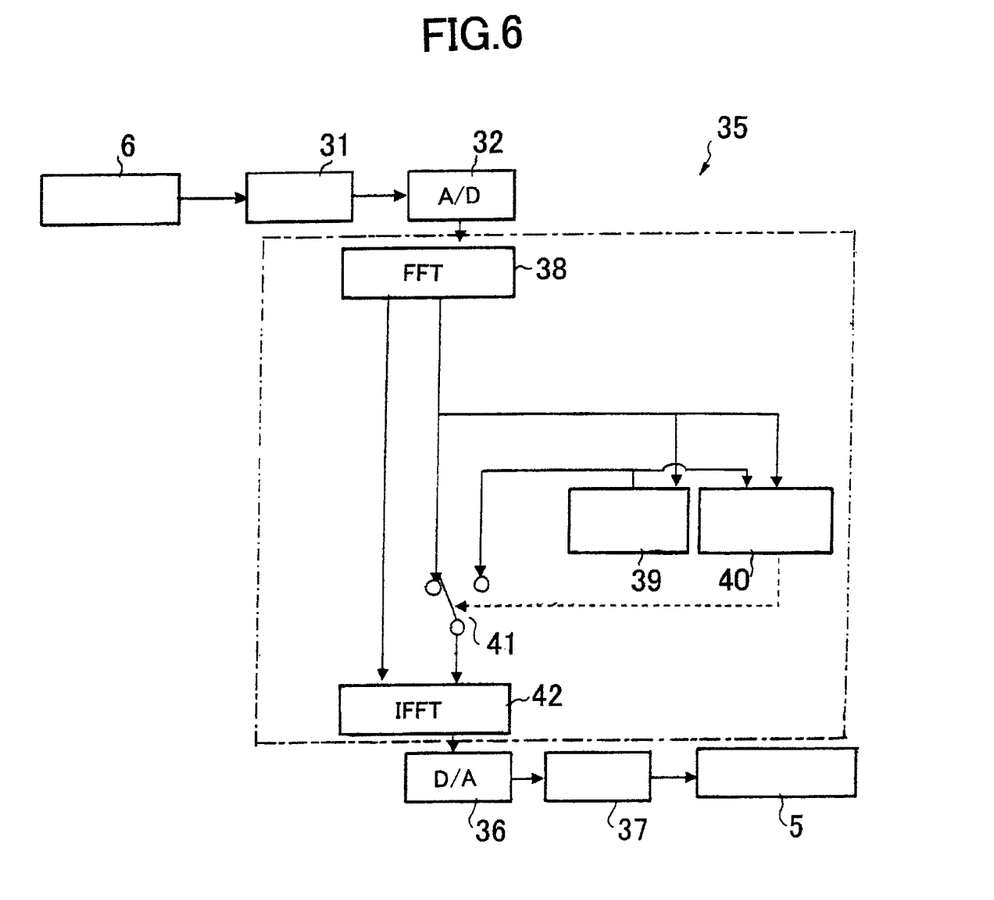
FIG. 6 is a general block diagram illustrating a delayed noise removing unit.

As shown in FIG. 5 and FIG. 6, the main body 4 of the detector incorporates a voltage amplifier 31, an A/D converter 32, plurality types of units for removing noise, a D/A converter 36, and a voltage amplifier 37.

In this embodiment, a band-pass filter 33, the comb filter 34 and the delayed noise removing unit 35 are employed as the plurality types of the noise removing units.

The band-pass filter 33 allows for passage of frequency components within a specific range, and attenuates the components outside the range.

The pass-band of the filter 33 is allowed to be appropriately set by operating the high-pass and low-pass setting keys 16 and 17.

In the main body 4, a high frequency range of 400, 600, 800, 1200, and 2200 Hz can be set by operating the key 16, and also a low frequency range of 0, 100, 200, and 400 Hz can be set by by operating the key 17.

For example, when a high frequency of 800 Hz is set by the key 16 and a low frequency of 200 Hz is set by the key 17, the band pass filter 33 allows for passage of frequency components in the range from 200 to 800 Hz.

The comb filter 34 attenuates frequency components at a predefined frequency space, and allows for passage of other frequency components.

The attenuation band for the filter 34 can be appropriately set by operating the composite filter setting key 18

In the main body 4 of the detector, the basic frequency can be set to 50 Hz or 60 Hz by operating the comb filter setting key 18, and frequency components up to a 5th harmonic can be attenuated for each frequency respectively.

For example, when the basic frequency is set to 50 Hz by operating the comb filter setting key 18, the frequency components of 50, 100, 150, 200, and 250 Hz can be attenuated by the comb filter 34.

The delayed noise removing unit 35 converts the signals including leaking sounds and external noises mixed therein into the signals consisting of specific frequency components, compares powers of frequency components included in signals sampled at different time points respectively, selects the frequency component having a smaller power throughout the band width, and generates the signal from which noises have been removed with the frequency components.

The difference in the sampling time, namely a delay time can be set to a desired value by operating a delayed noise removal mode setting key 19.

In the main body 4 of the detector, any of LEVEL 1 (0.2 seconds of delay time), LEVEL 2 (1.0 second of delay time), and LEVEL 3 (3.0 seconds of delay time) can freely be selected by the delayed noise removal mode setting key 19.

For example, when the LEVEL 2 is selected by the delayed noise removal mode setting key 19, the signals sampled with a delay time of 1.0 second are compared to each other, and the frequency component having a smaller power is selected throughout the band width, and thus the signal with noises removed can be generated.

The delayed noise removing unit 35 includes, as specifically shown in FIG. 6, a high speed Fourier transform processing section 38 for transforming a signal into frequency components, a signal storing section 39 for storing the signal consisting of the frequency components and generating a delayed signal, a signal determining section 40 for determining a power by comparing the frequency components of the signals sampled at different points of time, a switching section 41 for appropriately selecting a signal consisting of appropriate frequency components by connecting to any appropriate terminal, and a high speed inverse Fourier transform processing section 42 for generating a signal from the selected frequency components.

Leakage sounds of fluids such as water and gas are generated constantly, while the traffic noises caused by cars and pedestrians at night are generated temporally. Therefore, when the power of specific frequency component of the output signal at a point of time is large, it is considered that external noses are generated at the time. Thus, by selecting a signal including a specific frequency component having a smaller power with the delayed noises removing unit 35, an output signal including less external noises can be extracted.

Figure 7:
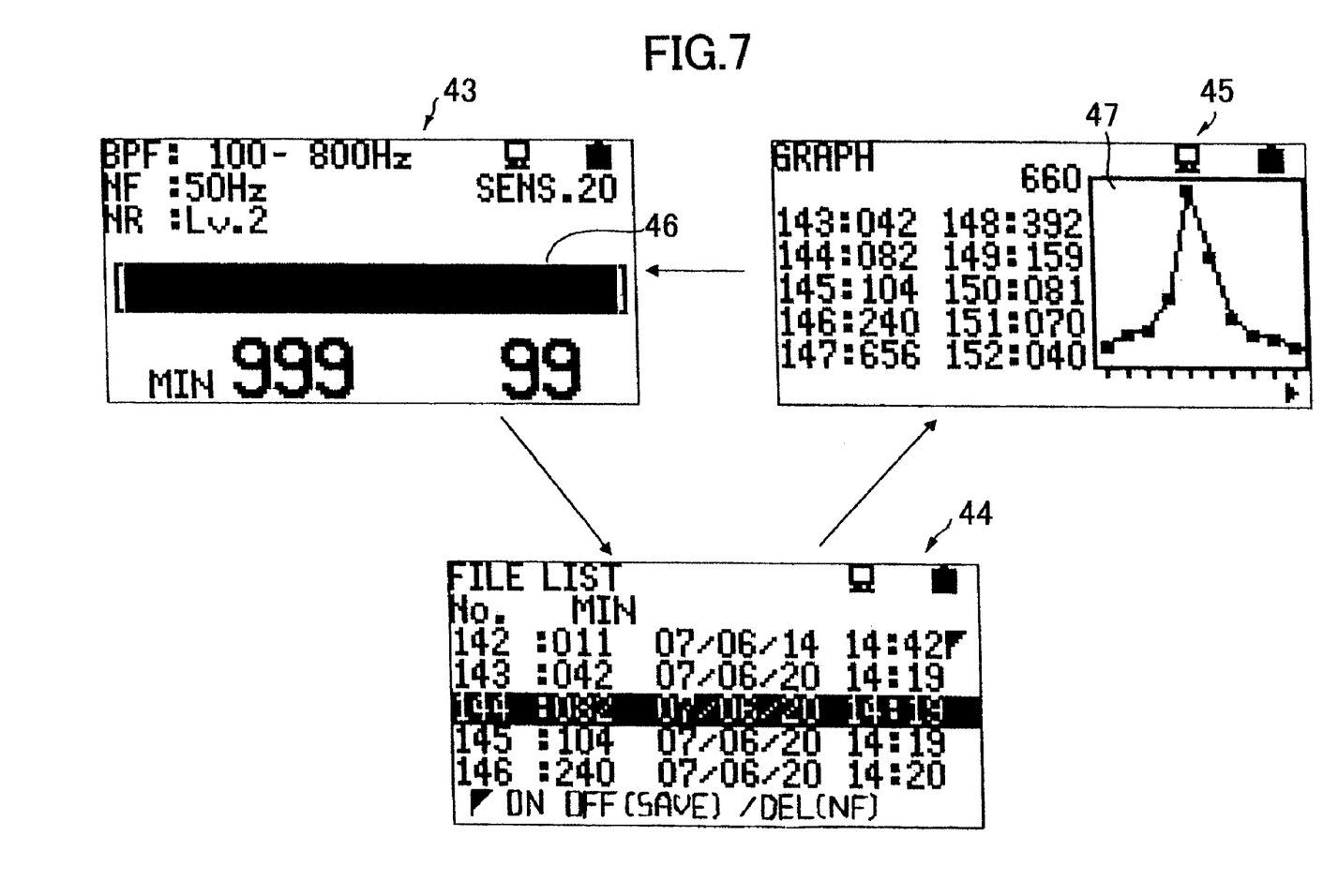
FIG. 7 is an explanatory view illustrating a screen provided on a display unit of a main body of the detector.

When the power switch 25 is pressed, an initial screen is displayed on the display unit 15, and in one or two seconds, a level display screen 43 is displayed, as shown in FIG. 7.

The screen is sequentially switched to the level display screen 43, a file list display screen 44, a graph display screen 45, and the like, each time the screen switching key 20 is pressed.

When the screen of the unit 15 cannot be identified, for instance, at night, the back light of the unit 15 can be turned ON by pressing a back light key 22, so that the operator can always visually check the screen.

On a level display screen 43, a minimum value for the vibration detection level during the audio data sampling is displayed. The value for the minimum vibration detection level is displayed as a relative value in the range from 000 to 999, such as "MIN999".

A sound level bar 46 visualizes fluctuations of the value for the vibration detection level, and a fluctuation of the audible level bar 46 is displayed as a relative value in the range from 00 to 99, such as "99".

On the file list display screen 44, a file number, a minimum value for the minimum vibration detection level, a date, and a time of day are displayed. The above are file data which can be stored in a predefined file in an internal memory (not shown).

On the graph display screen 45, the file number and the value for the minimum vibration detection level are displayed as numerical values, file numbers and values for minimum vibration detection level are displayed for selected 10 items of file data by a graph 47.

On the level display screen 43, when the data storing key 21 is pressed in the state where the switch 13 in the handle member 3 or the switch 23 in the main body 4 is pressed and turned ON, the file number of the file to be stored is displayed on the screen.

When the switch 13 or the switch 23 is pressed and turned OFF, the value for the minimum vibration detection level is stored into a predefined file in the internal memory, and the file number of the file is deleted from the screen.

By connecting a cable connector for a personal computer to the communicating port 26 in the main body 4, the file data stored in the internal memory in the main body 4 is transferred in response to a data transfer command from the personal computer.

In the headphone 5, as shown in FIG. 1, right and left ear pads 49 and 50 are provided at both ends of a headband 48, and a cord 51 extends from the ear pad 49.

Use and actions of the leakage detector 1 according to the present invention when applied to detection of water leakage in a water pipe line buried in the ground are described below.

At first, the vibration detector 2, the handle member 3, and the headphone 5 are connected to the main body 4, and a power is turned ON by pressing the power switch 25. Then, by operating the filter setting key 16, the filter setting key 17, the comb filter setting key 18 and the delayed noise removing mode setting key 19, an optimal noise removing unit suited to an environment in which leakage detection is performed is selected and conditions for detection are set.

Then, the headphone 5 is set on the operator's head, and the main body 4 of the detector 4 is hung down from the operator's neck with a band and held on the operator's wrist also with the band. Then the handle member 3 is gripped with one hand, and the pickup 6 is placed on the ground surface under which a water pipe line is buried. Either the audible data switch 13 on the handle member 3 or the audible data switch 23 on the main body 4 of the detector is pressed to turn on the detector, so that detection signals are output from the pickup 6.

The leakage sound detected by the pickup 6 is amplified by the voltage amplifier 31 in the main body 4, and noises are removed from the signal by any the filters 33, 34, and the delay noise removing unit 35 selected according to the necessity, and is output as vibration sounds to the headphone 5.

The operator moves along the water pipe line on the ground surface listening to and checking amplitude and tone of vibration sounds output from the headphone 5, places the pickup 6 on the ground surface at an appropriate space, and thus continues the work for checking amplitude and tone of the output vibration sounds.

The operator determines whether water leakage is occurring in a water pipe line based on amplitude and tone of the output vibration sounds, and when it is determined that there is water leakage, the operator search a point on the ground where the detected vibration level is maximized, and determines that water leakage is occurring in the water pipe line at a point just below the point.

By pressing the switch 25, a predefined screen is displayed on the display unit 15, the value of minimum vibration detection level during the audio data sampling is displayed, and fluctuations of the vibration detection level are visualized by the bar 46. Also, the file number, the value for minimum vibration detection level, the date, and the time of day are displayed as file data, and the values of the minimum vibration detection levels corresponding to the file numbers are displayed by the graph 47.

As described above, with the leakage detector 1 according to the present invention, not only the level for the vibration detection can be checked as audio data by the operator, but also the audio data is visualized as numerical value and a graph. Thus, the leakage detector according to the present invention makes it possible for operators not so skilled in the leakage detection work to accurately detect occurrence and a position of leakage in a fluid pipe line without fail. Also those skilled in the work can detect leakage more accurately without fail.

With the leakage detector 1 according to the present invention, even when various noises including a constant noises having specific frequencies respectively such as those generated by in-stored equipment at stores stayed open until late at night and automatic vending machines and the like, temporal noises such as those generated by cars, pedestrians and the like, and irregular noises such as those generated, for example, by barking dogs are generated concurrently and mixed with each other, leakage sounds can be captured without fail by applying all of the band pass filter 33, the comb filter 34, and the delayed noise removing unit 35 to remove the noises.

When various noises including temporal traffic noises generated by cars, pedestrians and the like and irregular sounds generated, for instance, by a barking dog are mixed in the leakage sounds, by applying the band-pass filter 33 and the delay noise removing unit 35 to remove the noises, leakage sounds can be captured without fail.

When there are less noise at locations, for example in a suburban area, the band-pass filter can exclusively be applied to ensure capture of the leakage noise with the other noise removed.

As described above, by using the leakage detector 1 according to the present invention, an optimal noise removing unit can be selected and conditions for noise detection can be set according to necessity by taking into consideration types of noises being generated in an environment where leakage detection is performed, and therefore occurrence and a position of leakage in a fluid pipe line buried in the ground can be accurately detected without fail.

What is claimed is:

1. A leakage detector comprising:
   a vibration detector having a pickup incorporating a piezoelectric element;
   a main body of the leakage detector incorporating a voltage amplifier for voltage-amplifying an output signal and a plurality of types of noise removing units each for removing noises from the output signal; and
   a headphone,
   wherein the plurality of types of noise removing units include a delayed noise removing unit and at least one type of noise removing unit from among a band pass filter and a comb filter, and
   wherein said delayed noise removing unit converts the output signal including leaking sounds and external noises mixed therein into a converted signal consisting of specific frequency components, compares powers of the frequency components included in the converted signal sampled at different time points respectively, selects a frequency component, from among the frequency components, having a smaller power throughout a bandwidth, and generates a signal from which noises have been removed based on the frequency components that are not selected.

2. The leakage detector according to claim 1, wherein the plurality of types of noise removing units can be combined with each other according to a necessity in use.

3. The leakage detector according to claim 1, wherein the plurality of types of noise removing units allows for change of conditions for detection.

4. The leakage detector according to claim 1, wherein the main body of the leakage detector has a display unit for displaying data for detected vibration sounds on a predefined screen.

5. The leakage detector according to claim 1, further comprising:
   a handle member for holding the vibration detector, wherein an audio switch is provided on the handle member.

6. The leakage detector according to claim 1, wherein the vibration detector has a noise absorbing member, which is a rubber block, mounted on a signal output cord.

7. The leakage detector of claim 6, wherein the rubber block, mounted on the signal output cord, comprises an insertion path having a substantially horse shoe-shaped form and a block diameter of the rubber block is substantially identical to a cord diameter of the signal output cord.

* * * * *